UNITED STATES PATENT OFFICE.

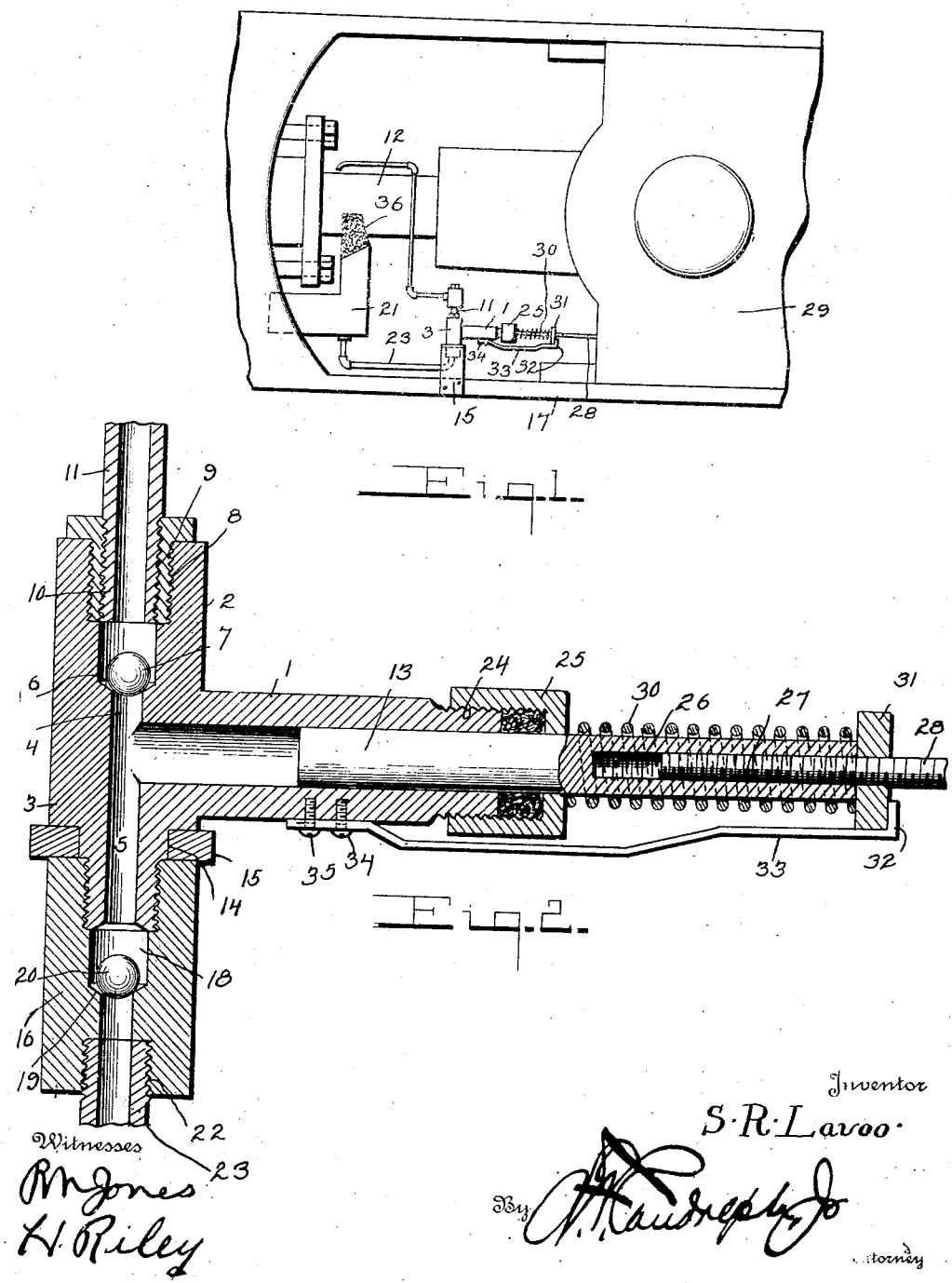

STANLEY R. LAVOO, OF HANNIBAL, MISSOURI.

PISTON-ROD LUBRICATOR.

1,182,777.   Specification of Letters Patent.   Patented May 9, 1916.

Application filed October 20, 1915. Serial No. 56,971.

*To all whom it may concern:*

Be it known that I, STANLEY R. LAVOO, a citizen of the United States, residing at Hannibal, in the county of Marion and State of Missouri, have invented certain new and useful Improvements in Piston-Rod Lubricators; and I do hereby declare the following to be a full, clear, and exact description of the invention, such as will enable others skilled in the art to which it appertains to make and use the same.

The invention relates to improvements in piston rod lubricators.

The object of the present invention is to improve the construction of piston rod lubricators and to provide a simple, practical and comparatively inexpensive piston rod lubricator adapted to obviate the necessity of employing oil cups and the frequent filling of the same and capable of automatic operation by a piston rod to feed a lubricant to the same and to return a portion of the lubricant back to the piston after it has been fed thereto and dripped therefrom.

A further object of the invention is to provide a piston rod lubricator of this character capable of ready adjustment to adapt the feed of the lubricant to the requirements of the piston rod whereby the latter will be positively and uniformly lubricated to the desired extent.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

In the drawing Figure 1 is a side elevation of a piston rod lubricator constructed in accordance with this invention and shown applied to a piston rod, Fig. 2 is an enlarged longitudinal sectional view through the lubricator.

Like numerals of reference designate corresponding parts in the several figures of the drawing.

In the accompanying drawing in which is illustrated the preferred embodiment of the invention, 1 designates a horizontally disposed pump cylinder provided at one end with upwardly and downwardly extending tubular portions 2 and 3 provided with bores or openings 4 and 5 which communicate with the interior of the pump cylinder. The upper tubular extension 2 is counter-bored to provide a valve seat 6 and to receive a check valve 7 preferably consisting of a ball, the seat being beveled as shown. The counter-bored portion of the upper tubular portion 2 is interiorly threaded to receive a bushing or gland 8 which is interiorly threaded at 9 to receive the threaded end 10 of a feed pipe 11 extending to and terminating at a point above a piston rod 12 whereby when a plunger 13 is moved inwardly lubricant within the pump cylinder 1 will be forced outwardly through the feed or supply pipe 11 and cause it to drip upon the piston rod.

The lower depending or downwardly extending tubular portion 3 is reduced to fit an opening 14 in a bracket 15 and is threaded below the reduced portion 14 to receive a valve casing 16 which is screwed against the bracket whereby the pump cylinder is firmly secured to the same. The bracket 15 is mounted on one of the cross head guides 17 and the valve casing 16 which is provided with an interior valve chamber 18 has a valve seat 19 at the bottom thereof to receive a suction operated valve 20 which is adapted to open on the outward movement of the plunger 13, the check valve 7 remaining closed during such a movement to permit the plunger to draw into the cylinder 1 oil from a receptacle 21. The lower end of the valve casing 16 is bored and threaded at 22 to receive one end of a return pipe 23 which extends from the receptacle 21 to the lower tubular portion of the pump cylinder 1. The receptacle 21 is located below the piston rod and is adapted to receive oil dripping therefrom and it is adapted to be supplied from time to time as required.

The cylinder 1 is threaded at its outer portion 24 for the reception of a stuffing box 25 and the outer portion of the plunger 13 has a threaded bore or opening 26 for the reception of a threaded portion 27 of an adjustable rod or member 28 located in the path of the cross head 29 and adapted to be engaged and moved inwardly by the same for operating the plunger 13 during the feeding movement thereof.

The return or outward movement of the plunger is effected by means of a coiled spring 30 disposed on the outer portion of the plunger 13 and interposed between a nut 31 and the stuffing box 25. The nut 31 which is arranged on the threaded portion of the adjustable rod or member abuts against the outer end of the plunger 13 and serves as a lock nut and also as a stop or abutment for the outer end of the spring 30. The outward movement of the plunger 13 is limited by a relatively fixed stop 32 consisting of a lug or projection extending from an arm or rod 33. The rod or arm 33 is secured at its inner end 34 by screws or other suitable fastening devices to the pump cylinder 1. The stop 32 limits the outward movement of the plunger 13 and the stroke thereof is regulated by the adjustable rod or member 28 which is adapted to be screwed inwardly or outwardly as required.

While the lubricator is designed particularly for use on compressors it is adapted for lubricating piston rods of engines and various other machines.

What is claimed is:—

1. A lubricator of the class described including a cylinder, a plunger operating in the cylinder and provided at its outer end with means for engagement with a reciprocating part of an engine for actuating the plunger in one direction, a coiled spring disposed on the plunger for moving the same in the opposite direction, feed and return pipes connected with the cylinder and check valves for the said pipes.

2. A lubricator of the class described including a cylinder, a plunger operating in the cylinder, and having a threaded bore, an adjustable member having a threaded portion operating in the bore, a lock nut arranged on the threaded portion of the said member and engaging the plunger and a spring disposed on the plunger and bearing against the lock nut for urging the plunger in one direction.

3. A lubricator of the class described including a cylinder, a plunger operating in the cylinder and having a threaded bore, an adjustable member having a threaded portion operating in the bore, a lock nut arranged on the threaded portion of the said member and engaging the plunger and a spring disposed on the plunger and bearing against the lock nut for urging the plunger in one direction and an arm secured to the cylinder and having a projecting lug arranged in the path of the nut for limiting the outward movement of the plunger.

In testimony whereof I affix my signature in presence of two witnesses.

STANLEY R. LAVOO.

Witnesses:
  Mrs. R. N. GILBERT,
  LOUISE HORSTMEYER.